(12) United States Patent
Hirz et al.

(10) Patent No.: US 10,652,806 B1
(45) Date of Patent: May 12, 2020

(54) DYNAMIC MULTI-CHANNEL POWER MANAGEMENT FOR NEIGHBOR DISCOVERY

(71) Applicant: L3 Technologies, Inc., New York, NY (US)

(72) Inventors: Philip M. Hirz, Holladay, UT (US); Brent Kenney, Bountiful, UT (US); Thomas R. Giallorenzi, Sandy, UT (US); Matthew J. Reimann, Draper, UT (US); Patrick L. Newbold, Draper, UT (US)

(73) Assignee: L3 Technologies, Inc., New York, NY (US)

( * ) Notice: Subject to any disclaimer, the term of this patent is extended or adjusted under 35 U.S.C. 154(b) by 0 days.

(21) Appl. No.: 16/412,045

(22) Filed: May 14, 2019

(51) Int. Cl.
*H04W 4/00* (2018.01)
*H04W 48/16* (2009.01)
*H04W 52/38* (2009.01)
*H04W 84/18* (2009.01)

(52) U.S. Cl.
CPC .......... *H04W 48/16* (2013.01); *H04W 52/38* (2013.01); *H04W 84/18* (2013.01)

(58) Field of Classification Search
CPC ...... H04W 48/16; H04W 52/38; H04W 84/18
See application file for complete search history.

(56) References Cited

U.S. PATENT DOCUMENTS

| | | | |
|---|---|---|---|
| 6,810,428 B1* | 10/2004 | Larsen | H04B 7/2606 709/238 |
| 9,130,689 B1 | 9/2015 | Giallorenzi et al. | |
| 9,402,601 B1* | 8/2016 | Berger | A61B 8/4472 |
| 2013/0324182 A1* | 12/2013 | Deng | H04W 92/18 455/522 |
| 2015/0327183 A1* | 11/2015 | Park | H04W 52/243 370/311 |
| 2015/0327188 A1* | 11/2015 | Bagheri | H04W 52/383 455/426.1 |
| 2017/0353932 A1* | 12/2017 | Sorrentino | H04W 52/367 |
| 2017/0359835 A1* | 12/2017 | Seo | H04B 7/14 |
| 2018/0020339 A1* | 1/2018 | Agiwal | H04W 76/14 |
| 2018/0249429 A1* | 8/2018 | Zhang | H04W 52/18 |
| 2019/0239203 A1* | 8/2019 | Chae | H04B 17/327 |

* cited by examiner

*Primary Examiner* — Charles T Shedrick
(74) *Attorney, Agent, or Firm* — Workman Nydegger

(57) ABSTRACT

Transmitting a probe signal. A method includes transmitting a signal, having a predetermined total power, during a transmit cycle. The signal has a traffic channel transmitting user data and a probe channel to locate new nodes to add to the network. The transmit channel uses a first portion of the total power and the probe channel uses a second portion of the total power. The method further includes performing a probe cycle by lowering the power in the first portion of the total power and raising the power in the second portion of the total power, but maintaining the total power at the same level as the total power during the transmit cycle. The method further includes, after the probe cycle, raising the power in the first portion of the total power and lowering the power in the second portion of the total power.

20 Claims, 4 Drawing Sheets

DYNAMIC MULTI-CHANNEL POWER MANAGEMENT FOR NEIGHBOR DISCOVERY

BACKGROUND

Background and Relevant Art

Mesh networks are communication networks formed by nodes that are able to communicate with each other by virtue of being sufficiently near each other (or other nodes in the mesh network) to discover each other, send messages to each other, and receive message from each other. Note that this may be accomplished through one or more message hops to/from intermediate nodes. For example, a node that wishes to be in a network with other nodes may send a discovery message to attempt to discover other nodes. Nodes receiving the discovery message can respond, such as by indicating their communication configuration and availability to join a network. Once nodes have formed a network using this process, the nodes can send communications to each other.

In particular, communication between network nodes is generally limited based on transmission power of communications, data rate of the communications, noise patterns in an environment, electromagnetic barriers in an environment, etc. It can be difficult to pre-calculate which nodes are sufficiently able to communicate with each other to form an effective network. Thus, some systems may discover "neighbors" that are able to communicate by allowing the various nodes to send discovery messages to attempt to connect with other nodes. If a node can respond to a discovery message, then the node can join the mesh network, as there is a reasonable expectation that the node sending the discovery message, and the node responding to the discovery message will be able to communicate with each other in a mesh network.

Typically, nodes in a mesh network will send user data (i.e., data for use of users of nodes in a network) network traffic between nodes in a mesh network for a period of time, and then will cease sending user data network traffic for a short period of time to send discovery messages to discover new nodes to add to the mesh network. In this case, user data messages and discovery messages compete with each other for bandwidth. Alternatively, some systems have separate side channels to probe a network. However, this requires additional spectral bandwidth.

These methods of neighbor discovery and node joining require interruption of user data network traffic flow or additional spectral resources while neighbor information is time division multiplexed with user data or additional channels are used to allow new users to join.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method of transmitting a probe signal for locating neighbors to add to a network. The method includes transmitting a signal during a transmit cycle, the signal having a predetermined total power. The signal has a traffic channel transmitting user data to be communicated to other nodes in the network and a probe channel to locate new nodes to add to the network. The transmit channel uses a first portion of the total power and the probe channel uses a second portion of the total power. The method further includes performing a probe cycle by lowering the power in the first portion of the total power from a first traffic power level to a second traffic power level and raising the power in the second portion of the total power from a first probe power level to a second probe power level, but maintaining the total power at the same level as the total power during the transmit cycle. The method further includes, after the probe cycle, raising the power in the first portion of the total power and lowering the power in the second portion of the total power.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
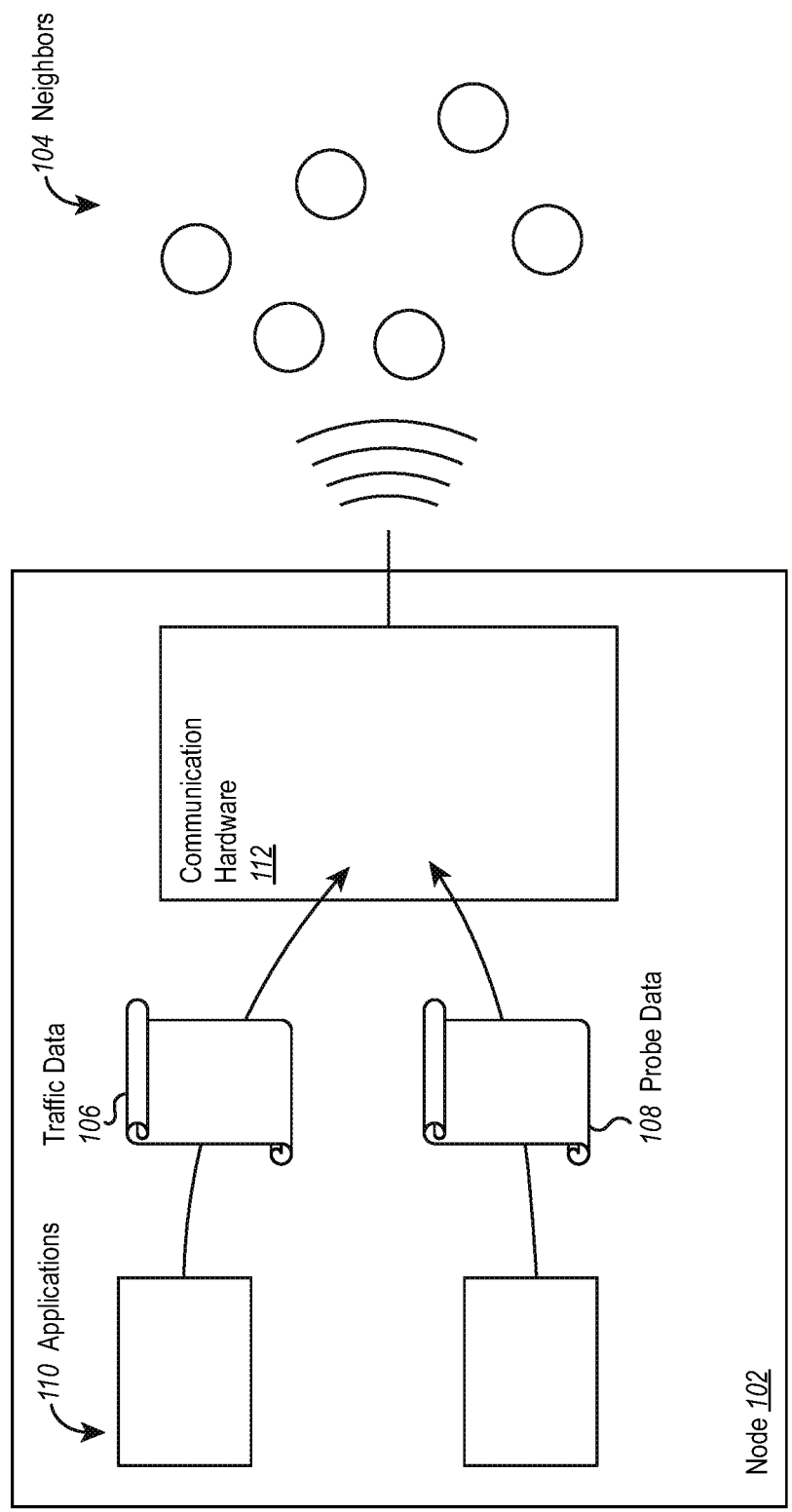
FIG. 1 illustrates a node transmitting traffic data and probe data.

Embodiments illustrated herein include systems and/or methods for discovery of neighbors, in an environment, that can be added to a mesh network while maintaining an uninterrupted flow of user data among already existing nodes in the mesh network. New neighbors may be more distant to some point than existing neighbor nodes in a mesh network. In some embodiments, this distant neighbor discovery technique is achieved using a multi-channel direct sequence spread spectrum waveform, code division multiplex access (CDMA) implementation, where one channel (referred to herein as the traffic channel) is used to convey user data and the second channel (referred to herein as the probe channel) is used to facilitate acquisition and send network probe messages to distant users. In some embodiments, the two channels may share the same center frequency and be code division multiplexed with one another. The probe channel operates at a data rate appropriate for neighbor discovery while the data rate of the traffic channel is allowed to vary based on traffic flows and link management requirements.

In particular, during normal operation the ratio of traffic channel and probe channel, power levels are set such that the probe channel link range is identical or nearly identical to the traffic channel link range. Since the probe channel runs at a lower data rate than the traffic channel, the probe channel power is typically much lower than the traffic channel, which can run at higher data rates. This minimizes CDMA interference between the two channels while still allowing the probe channel to facilitate reacquisition for users that drop off the traffic channel.

During a neighbor discovery period the ratio of traffic channel and probe channel power levels are temporarily adjusted so that the probe channel link range is equivalent, or nearly equivalent, to the link range of the traffic channel running at some predetermined minimum acceptable data rate (resulting in increased link range for the probe channel, which remains at the lower rate). At the same time the traffic channel data rate is temporarily adjusted to operate through the additional interference caused by the relative increase in probe channel power level. Note that the objective is to maintain the same coverage area of the traffic channel. That is, the node can still be heard by the same neighboring nodes but at a reduced rate. Once the power and rate changes have completed, an acquisition block followed by a network probe message are sent on the probe channel. The acquisition block is a special sequence that allows nodes to synchronize their receivers (e.g. carrier phase alignment and symbol timing alignment) prior to sending the payload. The network probe message provides information about the transmitting node as well as information about the node's neighbors, including their, communication configuration (transmitters, receivers, communication frequencies, data rates, etc.) link performance metrics and relevant statuses. By exchanging this information, distant neighbors can advertise their existence, provide information for network topology decisions, and facilitate link formation. At the completion of the network probe message, the power levels and data rates of the probe and traffic channels are restored to their previous operating conditions existing prior to the neighbor discovery period. Alternatively at the completion of the network probe message, the power levels and data rates of the probe and traffic channels are set at new, different, power and rate allocations. In general, embodiments may be implemented where the power allocations are set again to points where the probe channel has essentially the same coverage area as the traffic channel. No that there are cases where the traffic channel is different than it was previously, so the power allocations can change slightly.

This technique provides a method of discovering potential neighbors in a network without significantly reducing or increasing the latency of the user data flow to the existing neighbors because the data rate was merely reduced and not stopped to send the probe message. The total power transmitted is also held constant so that it does not cause a sudden increase in interference to neighboring nodes.

Some embodiments of the invention use a multi-channel transmission with dynamic power management to facilitate neighbor discovery with minimal impact to the user data flow. Previous waveform implementations use a single channel implementation where discovery of new neighbors interrupts the flow of user data or uses a side channel. If a multi-channel approach were used in previous systems, the power levels of the two channels were typically not adjusted dynamically to allow changes in link range depending on the intent of the two channels.

Referring now to FIG. 1, additional details are illustrated. FIG. 1 illustrates a node 102 in a mesh network. The node 102 is configured to send various data to neighbors 104, which are other nodes. Some of the neighbors 104 may be part of the same mesh network as the node 102. Others of the neighbors 104 may be nodes with which the node 102 can cause to be added to the mesh network.

As noted previously, the node 102 transmits data to the neighbors 104. As discussed previously, that data can be traffic data 106 or probe data 108. For example, applications 110 can send traffic data 106 or probe data 108, as appropriate to communication hardware 112.

The communication hardware 112 may include, for example, various modulators, filters, amplifiers, transmitters, antennas, transmission lines, or other hardware configured to transmit signals. This allows data to be encoded and transmitted from the node 102 to the neighbors 104. The neighbors 104 will have corresponding communication hardware that allows signals to be received from the node 102. Note that the communication hardware 112, as well as the communication hardware at the neighbors 104, may include various antennas, receivers, demodulators, filters, transmission lines, and the like configured to receive, demodulate, and recover data sent by other communication hardware. This allows communications to be achieved between the node 102 and the neighbors 104.

The communication hardware 112 may be controlled by the node 102, such as by using various hardware and/or software controls, to vary the power and/or data rate of data transmitted by the communication hardware 112. In particular, as discussed previously, the communication hardware 112 may be, in some embodiments, CDMA communication hardware that is able to transmit data on different channels. Thus, in some embodiments, the communication hardware 112 can transmit the traffic data 106 on a traffic channel while the probe data 108 is transmitted on a probe channel. In this fashion, the traffic data 106 can be transmitted using a particular power and/or data rate by the communication hardware 112 while the probe data 108 can be transmitted by the communication hardware 112 using a different power and/or data rate. In some embodiments, this can be accomplished by scaling channels and combining them digitally prior to any amplification. Alternatively, this can be accomplished by varying modulation of modulators in the communication hardware 112 to control data rate and/or amplification of amplifiers in the communication hardware 112 to control power.

As noted previously, it is desirable that the traffic data 106 and the probe data 108 are transmitted by the communication hardware 112 in a fashion such that communications, by either channel, transmitted to neighbors 104 reach a similar physical distance (i.e., have a similar link range) whether those communications are the result of traffic data 106 or probe data 108. Probe data 108 is typically transmitted at a lower data rate than the traffic data 106. Lower data rate communications travel farther than higher data rate communications because there is more energy per transmitted symbol, assuming that the communications are transmitted with the same modulation. However, embodiments can attempt to cause the traffic data 106 to be transmitted a similar distance to the probe data 108 by transmitting the traffic data 106 at a higher power in the traffic channel than in the probe data 108 in the probe channel. In particular, knowing the power and data rate of the probe channel, power and data rate of the traffic channel can be configured such that the probe channel and traffic channel both have approximately the same link range.

Note that typically it is desirable that the total power used for both the traffic channel and probe channel remains relatively constant (within some predetermined threshold) over some predetermined period of time. That is, it is desirable that the combined total power transmitted from the node 102 remains fairly constant over time within some predetermined threshold. This is typically done to ensure that communications from the node 102 remain undetectable (or at least have a low probability of detection) by adversary entities in an environment with the node 102. Alternatively or additionally this can be done to ensure that there is a low probability of interception of communications from the node 102. Alternatively, or additionally, this can be done to ensure that there is a low probability of detecting the location of the node 102. In particular, the node 102 may transmit data using the communication hardware 112 by transmitting a spread spectrum signal that is modulated by a spreading signal to cause the data to be hidden beneath a noise floor. The neighbors 104 include communication hardware capable of despreading the signal so that they can recover the data even though the data is transmitted below the noise floor. An adversary, however, would not be able to (or would at least have a low probability of being able to) recover the signal, or even detect the signal, as the signal would be beneath the noise floor and therefore probabilistically undetectable by the adversary. However, if there were an increase in power of the signal transmitted by the communication hardware 112, this may cause the signal to be above the noise floor even though the signal has been spread by a spreading signal. Thus, the communication hardware 112 may be configured to maintain a relatively constant power level for signals transmitted by the communication hardware 112 to ensure that the communications are not transmitted above the noise floor allowing for detection by adversaries.

Note that the power levels can change gradually over time as conditions in the environment change, such as increased ambient noise, cosmic interference, radio frequency obstructions, and the like. However, embodiments may be configured to prevent the communication hardware 112 from abruptly changing power levels absent some known external event. That is, embodiments would not typically increase the power level as a result of an internal event such as a desire to send additional probe data and/or to increase the link range.

Rather, embodiments are configured to increase the link range, in some embodiments, by increasing the proportion of the total power allocated to the probe channel with a corresponding decrease in the portion of the total power allocated to the traffic channel. The link range of the traffic channel is maintained by reducing the data rate of the traffic channel. Thus, to accomplish neighbor discovery during a neighbor discovery period, even though data in the traffic channel is transmitted using lower power rather than prior to the neighbor discovery period, the link range of the traffic channel can nonetheless be maintained by reducing the data rate as appropriate. Indeed, note that in some embodiments, the data rate of the traffic channel may be reduced to a level that is a minimum level as defined by some predetermined threshold. As noted previously, the probe channel is often constant in data rate. Knowing the traffic channel data rate, and the probe channel data rate, appropriate power can be allocated between the traffic channel and the probe channel to cause both the traffic channel and probe channel to have the same link range, allowing these two channels to reach approximately the same neighbors in the neighbors 104.

Note that as used herein, the link range is dependent on the node 102's ability to transmit data and the various neighbors' ability to receive and decode that data. For example, the link range may be defined based on the signal-to-noise ratio of communications received by the neighbors 104. If the signal-to-noise ratio of a communication from the node 102 is sufficiently high that a particular neighbor can receive and decode the communication, then that neighbor is within the link range of the node 102.

Figure 2:
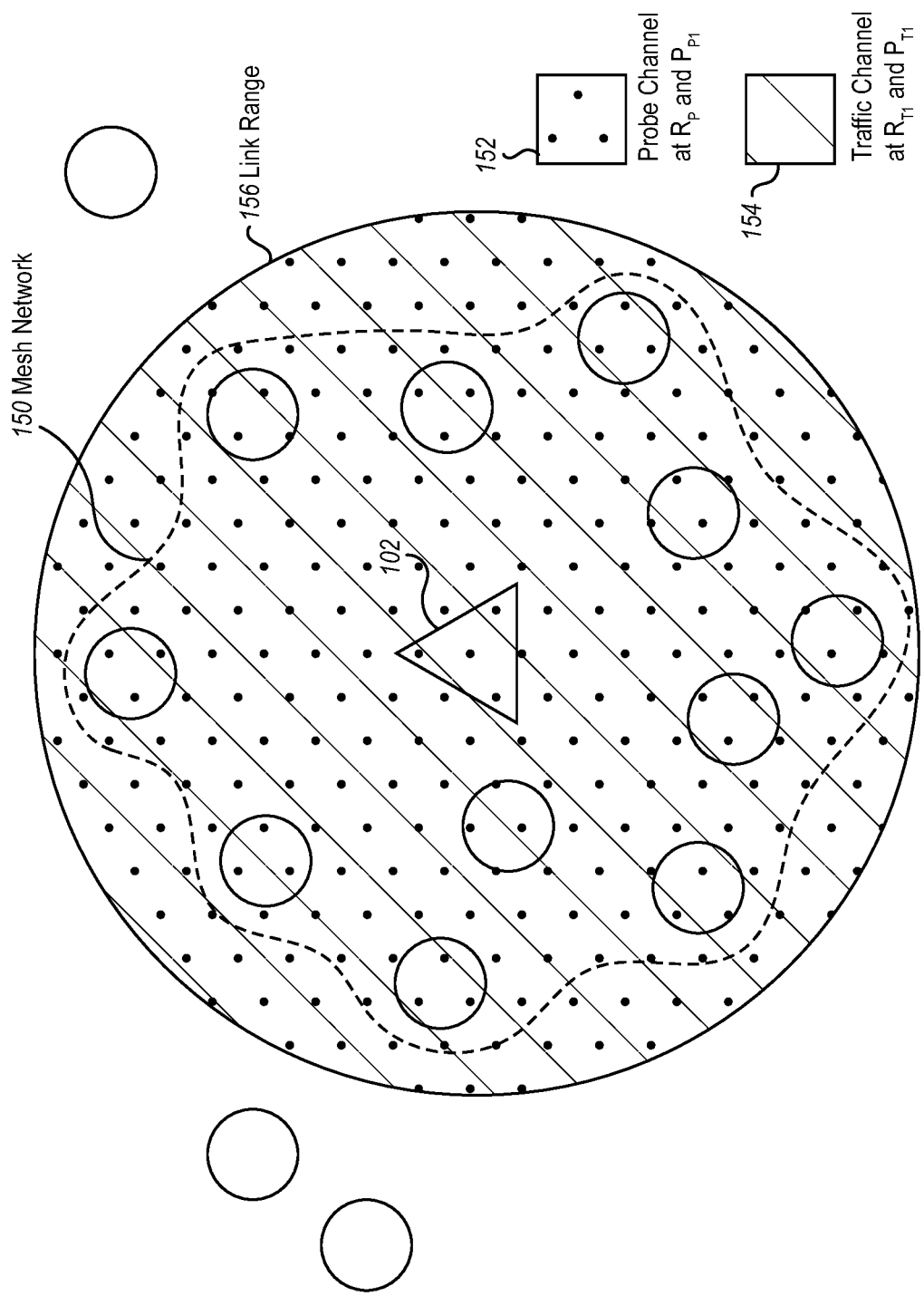
FIG. 2 illustrates a node transmitting data during a transmit cycle.

Referring now to FIG. 2, additional details are illustrated. FIG. 2 shows the node 102 in a mesh network 150, where the mesh network 150 includes a number of neighbors included in the mesh network. The node 102 transmits data on a probe channel 152 and a traffic channel 154. In this example, the probe channel 152 is transmitting data at a data rate $R_P$ and a power $P_{P1}$. The traffic channel is transmitting data at a data rate $R_{T1}$ and a power $P_{T1}$. In the example illustrated in FIG. 2, transmission at data rates and powers indicated controls the link range 156 for the probe channel 152 and traffic channel 154. As illustrated in FIG. 2, each of these channels 152 and 154 have the same link range 156. While FIG. 2 illustrates that these two channels have the same link range 156, it should be appreciated that there may be some minor variations in the actual link range of the different channels. In particular, one of the channels may have a slightly larger link range than the other channel. However, FIG. 2 illustrates the link range 156 being illustrated for both channels to illustrate the engineering goal of attempting to have the different channels 152 and 154 have the same link range 156. Thus, it should be appreciated that when channels are described as having the same link range, the channels should be treated as having substantially the same link range but where minor variations between the link ranges of the channels is acceptable and still within what is considered the same link range and/or substantially the same link range. In some embodiments, a predetermined threshold of variance between the link ranges for the channels may define equivalence of link range. For example, some embodiments may consider different link ranges to be equivalent so long as the link ranges are within 2% of one another. Other percentages or other measures may be used to determine link range equivalence.

Figure 3:
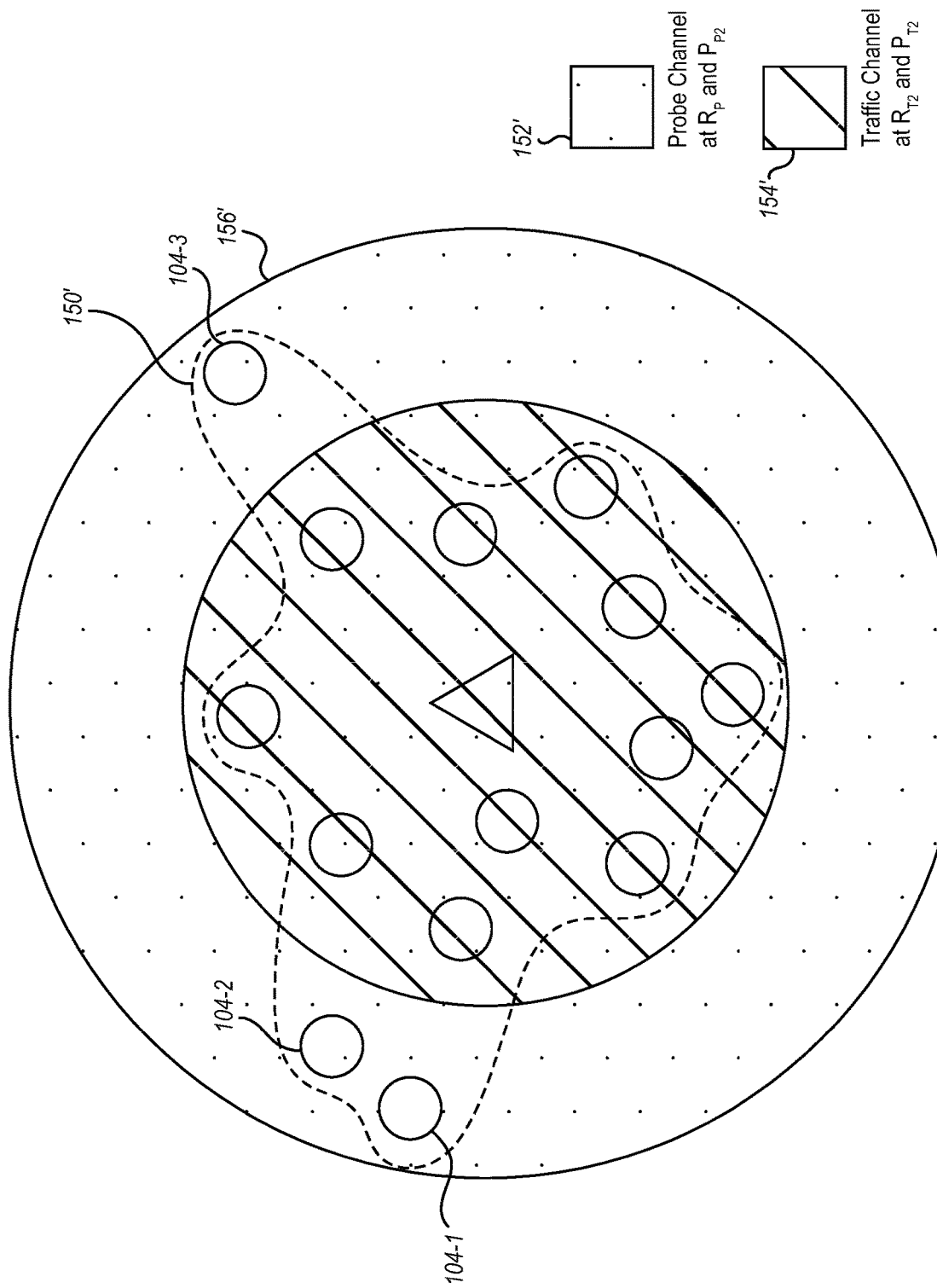
FIG. 3 illustrates a node transmitting data during a probe cycle.

As discussed above, it may be desirable to identify other neighbors that are more distant from the node 102 than nodes presently in the mesh network 150. This can be accomplished by increasing the power of the probe channel to cause the probe channel to have a greater link range. However, as discussed previously, it is also desirable that the traffic channel maintain the original link range 156 to not disrupt the mesh network 150. As it is desirable to maintain the same total power when attempting to discover new neighbors for the mesh network 150, the power of the traffic channel will also need to be reduced. This can be accomplished by lowering the communication rate of the traffic channel. Thus, the data rate of the traffic channel will be adjusted to maintain the link range as well as to compensate for the reduction in power of the traffic channel. An example of this is illustrated in FIG. 3 which illustrates an increased probe link range 156' by causing the probe channel 152' to transmit data at the data rate $R_P$ but with increased power $P_{P2}$, and causing the traffic channel to transmit data at the reduced data rate $R_{T2}$ and reduced power $P_{P2}$. For example, let $R_P$=1 kbps; $R_{T1}$=80.25 kbps; $R_{T,min}$=12 kbps. With these parameters, the beacon power is −18.957 dB below the total power and the traffic is −0.056 dB below the total power.

When the probe message is transmitted, the power allocations change to −11.121 dB for the beacon and −0.349 for the traffic. Since the traffic channel reduced power by about 0.3 dB, its rate ($R_{T2}$) changes to 75.8125 kbps to maintain the same range. The beacon power changed by almost 8 dB, so its range increases by about 2.5× (every 6 dB doubles the range). The probe channel extends to the same distance that the traffic channel would if it were to operate at its minimum rate (i.e. 12 kbps in the present example) during a transmit cycle with the same total power.

This allows the neighbors 104-1, 104-2, and 104-3 to become aware of node 102's presence. In particular, when the system is in a state as shown in FIG. 3 (i.e., a neighbor discovery period), acquisition blocks and network probe messages can be sent on the probe channel 152' to attempt to discover new neighbors.

If new neighbors are discovered these neighbors can be added to the mesh network 150 and can communicate with other nodes in the mesh network 150.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 4:
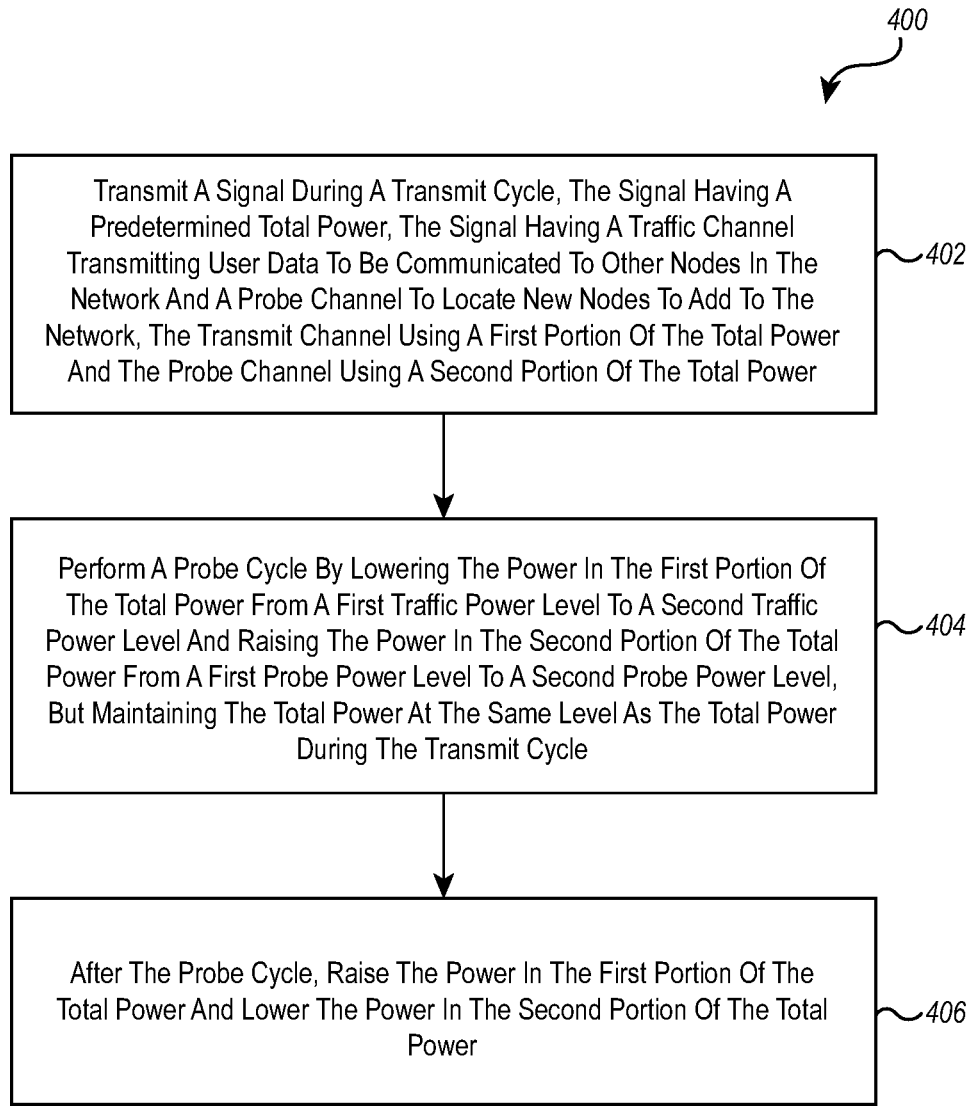
FIG. 4 illustrates a method of transmitting a probe signal for locating neighbors to add to a network.

Referring now to FIG. 4, a method 400 is illustrated. The method 400 includes acts for transmitting a probe signal for locating neighbors to add to a network. The method 400 includes transmitting a signal during a transmit cycle, the signal having a predetermined total power, the signal having a traffic channel transmitting user data to be communicated to other nodes in the network and a probe channel to locate new nodes to add to the network, the transmit channel using a first portion of the total power and the probe channel using a second portion of the total power (act 402).

The method 400 further includes performing a probe cycle by lowering the power in the first portion of the total power from a first traffic power level to a second traffic power level and raising the power in the second portion of the total power from a first probe power level to a second probe power level, but maintaining the total power at the same level as the total power during the transmit cycle.

The method 400 further includes, after the probe cycle, raising the power in the first portion of the total power and lowering the power in the second portion of the total power.

The method 400 may be practiced where transmitting the signal during the transmit cycle comprises transmitting the traffic channel and the probe channel such that the traffic channel and the probe channel having approximately, within some predefined threshold, the same link range. For example, in some embodiments, this may be determined by have a certain signal to noise ratio at some distance or at some receiver node.

The method 400 may be practiced where after the probe cycle, raising the power in the first portion of the total power and lowering the power in the second portion of the total power comprises raising the first portion of the total power to the first traffic power level and lowering the second portion of the total power to the first probe power level. That is, in some embodiments, power may be restored to the different channels to the levels that existed just prior to the probe cycle.

The method 400 may be practiced where after the probe cycle, raising the power in the first portion of the total power and lowering the power in the second portion of the total power includes raising the first portion of the total power to a power level different than the first traffic power level and lowering the second portion of the total power to a power level different than the first probe power level. This may be done in a way such that the traffic channel and the probe channel have approximately, within some predefined threshold, a same link range.

The method 400 may be practiced where performing a probe cycle further comprises transmitting the traffic channel and the probe channel such that the traffic channel maintains a same traffic channel link range as during the transmit cycle and the probe channel having an extended probe channel link range as compared to the transmit cycle. In some such embodiments, performing a probe cycle further comprises causing the probe channel to have approximately the same link range as a traffic channel transmitting at a lowest allowed communication rate would have. Thus, for example, there may be a lowest allowable communications rate below which the traffic channel should not fall.

The method 400 may be practiced where performing a probe cycle further includes lowering the data rate of the traffic channel. This can be done to maintain the same coverage area with less power.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of transmitting a probe signal for locating neighbors to add to a network, the method comprising:
    transmitting a signal during a transmit cycle, the signal having a predetermined total power, the signal including a traffic channel transmitting user data to be communicated to other nodes in the network and a probe channel transmitting probe data to locate new nodes to add to the network, the transmit channel using a first portion of the total power while the probe channel uses a second portion of the total power of the signal;
    performing a probe cycle by lowering the power in the first portion of the total power from a first traffic power level to a second traffic power level and raising the power in the second portion of the total power from a first probe power level to a second probe power level, but maintaining the total power at the same level as the total power during the transmit cycle; and
    after the probe cycle, raising the power in the first portion of the total power and lowering the power in the second portion of the total power.

2. The method of claim 1, wherein transmitting the signal during the transmit cycle comprises transmitting the traffic channel and the probe channel such that the traffic channel and the probe channel have approximately, within some predefined threshold, a same link range.

3. The method of claim 1, wherein after the probe cycle, raising the power in the first portion of the total power and lowering the power in the second portion of the total power comprises raising the first portion of the total power to the first traffic power level and lowering the second portion of the total power to the first probe power level.

4. The method of claim 1, wherein after the probe cycle, raising the power in the first portion of the total power and lowering the power in the second portion of the total power comprises raising the first portion of the total power to a power level different than the first traffic power level and lowering the second portion of the total power to a power level different than the first probe power level.

5. The method of claim 1, wherein performing a probe cycle further comprises transmitting the traffic channel and the probe channel such that the traffic channel maintains a same traffic channel link range as during the transmit cycle and the probe channel having an extended probe channel link range as compared to the transmit cycle.

6. The method of claim 5, wherein performing a probe cycle further comprises causing the probe channel to have approximately the same link range as a traffic channel transmitting at a lowest allowed communication rate.

7. The method of claim 1, wherein performing a probe cycle further includes lowering the data rate of the traffic channel.

8. A system comprising:
    one or more processors; and
    one or more computer-readable media having stored thereon instructions that are executable by the one or more processors to configure the system to transmit a probe signal for locating neighbors to add to a network, including instructions that are executable to configure the system to perform at least the following:
    transmitting a signal during a transmit cycle, the signal having a predetermined total power, the signal including a traffic channel transmitting user data to be communicated to other nodes in the network and a probe channel transmitting probe data to locate new nodes to add to the network, the transmit channel using a first portion of the total power while the probe channel uses a second portion of the total power of the signal;
    performing a probe cycle by lowering the power in the first portion of the total power from a first traffic power level to a second traffic power level and raising the power in the second portion of the total power from a first probe power level to a second probe power level, but maintaining the total power at the same level as the total power during the transmit cycle; and after the probe cycle, raising the power in the first portion of the total power and lowering the power in the second portion of the total power.

9. The system of claim 8, wherein transmitting the signal during the transmit cycle comprises transmitting the traffic channel and the probe channel such that the traffic channel and the probe channel have approximately, within some predefined threshold, a same link range.

10. The system of claim 8, wherein after the probe cycle, raising the power in the first portion of the total power and lowering the power in the second portion of the total power comprises raising the first portion of the total power to the first traffic power level and lowering the second portion of the total power to the first probe power level.

11. The system of claim 8, wherein after the probe cycle, raising the power in the first portion of the total power and lowering the power in the second portion of the total power comprises raising the first portion of the total power to a power level different than the first traffic power level and lowering the second portion of the total power to a power level different than the first probe power level.

12. The system of claim 8, wherein performing a probe cycle further comprises transmitting the traffic channel and the probe channel such that the traffic channel maintains a same traffic channel link range as during the transmit cycle and the probe channel having an extended probe channel link range as compared to the transmit cycle.

13. The system of claim 12, wherein performing a probe cycle further comprises causing the probe channel to have approximately the same link range as a traffic channel transmitting at a lowest allowed communication rate.

14. The system of claim 8, wherein performing a probe cycle further includes lowering the data rate of the traffic channel.

15. A system comprising:
communication hardware;
one or more applications coupled to the communication hardware and configured to provide user data and probe data to the communication hardware;
wherein the communication hardware is configured to transmit a signal during a transmit cycle, the signal having a predetermined total power, the signal including a traffic channel transmitting the user data to be communicated to other nodes in the network and a probe channel transmitting probe data to transmit probe data to locate new nodes to add to the network, the transmit channel using a first portion of the total power while the probe channel uses a second portion of the total power;

wherein the communication hardware is configured to perform a probe cycle by lowering the power in the first portion of the total power from a first traffic power level to a second traffic power level and raising the power in the second portion of the total power from a first probe power level to a second probe power level, but maintaining the total power at the same level as the total power during the transmit cycle; and after the probe cycle, wherein the communication hardware is configured to raise the power in the first portion of the total power and lower the power in the second portion of the total power.

16. The system of claim 15, wherein transmitting the signal during the transmit cycle comprises transmitting the traffic channel and the probe channel such that the traffic channel and the probe channel have approximately, within some predefined threshold, a same link range.

17. The system of claim 15, wherein after the probe cycle, raising the power in the first portion of the total power and lowering the power in the second portion of the total power comprises raising the first portion of the total power to the first traffic power level and lowering the second portion of the total power to the first probe power level.

18. The system of claim 15, wherein after the probe cycle, raising the power in the first portion of the total power and lowering the power in the second portion of the total power comprises raising the first portion of the total power to a power level different than the first traffic power level and lowering the second portion of the total power to a power level different than the first probe power level.

19. The system of claim 15, wherein performing a probe cycle further comprises transmitting the traffic channel and the probe channel such that the traffic channel maintains a same traffic channel link range as during the transmit cycle and the probe channel having an extended probe channel link range as compared to the transmit cycle.

20. The system of claim 15, wherein performing a probe cycle further includes lowering the data rate of the traffic channel.

\* \* \* \* \*